(12) United States Patent
Spata

(10) Patent No.: US 8,822,801 B2
(45) Date of Patent: Sep. 2, 2014

(54) MUSICAL INSTRUCTIONAL PLAYER

(76) Inventor: Gianni Alexander Spata, Arcadia, CA (US)

(\*) Notice: Subject to any disclaimer, the term of this patent is extended or adjusted under 35 U.S.C. 154(b) by 402 days.

(21) Appl. No.: 12/860,709

(22) Filed: Aug. 20, 2010

(65) Prior Publication Data

US 2012/0042766 A1 Feb. 23, 2012

(51) Int. Cl.
G09B 15/02 (2006.01)
G09B 15/04 (2006.01)
G09B 15/00 (2006.01)

(52) U.S. Cl.
CPC .................................. G09B 15/003 (2013.01)
USPC ............ 84/470 R; 84/477 R; 84/478; 84/484; 84/485 R

(58) Field of Classification Search
None
See application file for complete search history.

(56) References Cited

U.S. PATENT DOCUMENTS

| | | | | |
|---|---|---|---|---|
| 5,746,605 A * | 5/1998 | Kennedy | .................. | 434/307 R |
| 6,166,313 A * | 12/2000 | Miyamoto | .................. | 84/477 R |
| 2001/0029829 A1* | 10/2001 | Moe | ................................ | 84/478 |
| 2002/0004191 A1* | 1/2002 | Tice et al. | ..................... | 434/350 |
| 2004/0055441 A1* | 3/2004 | Katsuta | ........................ | 84/470 R |
| 2004/0094017 A1* | 5/2004 | Suzuki et al. | .................... | 84/609 |
| 2005/0241462 A1* | 11/2005 | Hirano | ........................... | 84/600 |
| 2006/0117935 A1* | 6/2006 | Sitrick | ........................ | 84/477 R |
| 2010/0307321 A1* | 12/2010 | Mann et al. | ..................... | 84/613 |
| 2011/0259176 A1* | 10/2011 | Pillhofer et al. | ............ | 84/470 R |

OTHER PUBLICATIONS

International Search Report and Written Opinion issued for PCT/US2011/046887, dated Dec. 13, 2011, 7 pages.

\* cited by examiner

*Primary Examiner* — Marlon Fletcher
(74) *Attorney, Agent, or Firm* — Trojan Law Offices

(57) ABSTRACT

A segmented, interactive audio-visual content progress bar and method of use whose divisions provide an information and instructional index of performance content. The progress bar provides a time linear segmentation of a user component of a performance content and a sound signal corresponding to the performance content. The progress bar provides a time progress marker advancing with time as a corresponding indicator of the user component of the performance content.

9 Claims, 2 Drawing Sheets

MUSICAL INSTRUCTIONAL PLAYER

TECHNICAL FIELD

The present invention generally relates to computerized instruction in the arts including instrumental, music, dance, choreography, and vocal training and instructions. More specifically, the present invention is drawn to a segmented, interactive audio-visual content progress bar whose divisions provide an information and instructional index of the content that is used for such interactive instruction and training.

BACKGROUND

Instruction in the arts and in particular musical instruction, like any art form, is usually taught in a methodical and progressive manner that begins with basic elements that must be mastered long before the expression of emotional content becomes a part of the artistry. That is, technique is strongly emphasized before maturity is acknowledged and receives full treatment in performance training. An example is the repetitive playing of scales to develop dexterity and note recognition. Many instruments, e.g., guitar, violin, piano, etc., can produce individual notes, and chords, which in various major or minor keys, are capable of producing an emotional correspondence. Dialog, through choice of words and subtlety of expression, can elicit similar emotional reactions. Body language in dance can also be similarly expressive. Therefore, a system and method of instruction that enables a student to access the more complex and emotionally expressive power of performance at the same time as acquiring technique can accelerate the learning process in a manner that is desirable and more personally rewarding.

SUMMARY

Disclosed is an apparatus for performance instruction, more specifically an instruction player. As an exemplary way of describing the features and benefits of the instruction player, the apparatus is directed to instruction for playing guitar. However, the details of the apparatus may be adapted and modified within the intended scope of the disclosure to include an instruction apparatus for choreography, singing, speech, musical instruments (e.g., string, wind, reed, percussion, and synthesizer), theatrical and movie acting, and combinations thereof.

In an embodiment, a segmented, interactive audio-visual content progress bar and method of use, controlled by a program stored on a computer memory and executed on a computer, the progress bar having divisions to provide an information and instructional index of performance content on a display are disclosed. The progress bar provides a time linear illustration of a user component of a performance content and a sound signal corresponding to the performance content.

DESCRIPTION OF THE FIGURES

For a more complete understanding of the present disclosure, reference is now made to the following descriptions taken in conjunction with the accompanying drawings.

DETAILED DESCRIPTION

Figure 1:
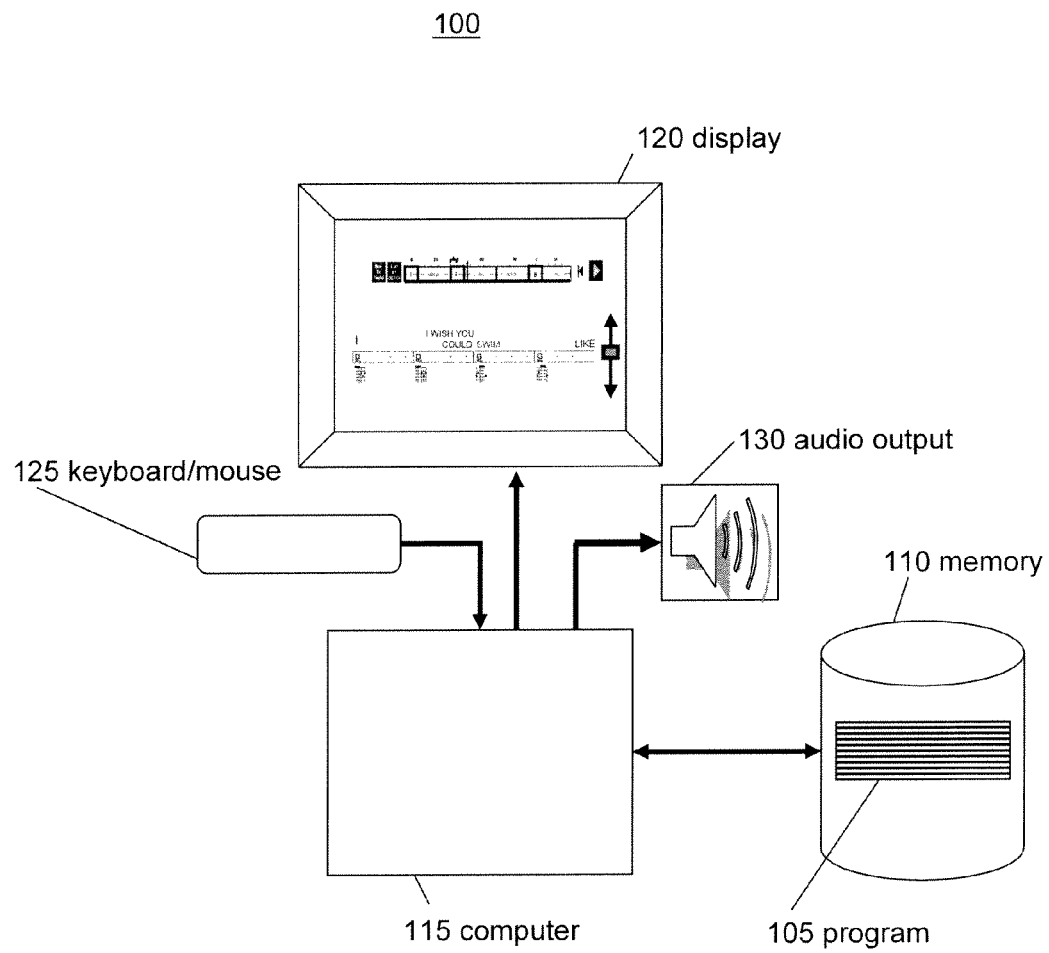
FIG. 1 shows instructional progress bars in accordance with the disclosure.

In an embodiment as shown in FIG. 1, a system 100 for using a learning instruction player includes a program 105 stored in a memory device 110 readable by a computer 115 capable of executing the commands of the program 105. A display 120 presents graphic instruction content under the control of the program 105, as operated interactively by a user through a keyboard/mouse device 125, and/or other device, which is coupled to the computer 115 and can transmit and/or receive data from the computer 115. An audio output device 130 coupled to the computer provides audio signal output corresponding to the graphic instruction content shown on the display 120.

Figure 2A:
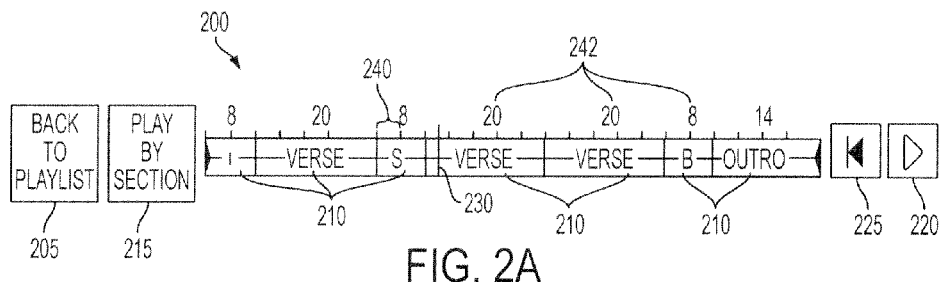
FIGS. 2A-2C shows macro-progress bars used for visual training.

In an embodiment as shown in FIG. 2A, the instructional player program 105 controls the display 120 for presentation of visual training material and an audio output for presentation of corresponding audio content. To describe the operation of the instruction player, the example of a guitar instruction player is presented. However, the instruction player may be adapted in detail to provide instruction for various other musical instruments, singing and voice training, choreography, acting, combinations of the foregoing, and the like.

In the example of the guitar instruction player, the display presents a macro-progress bar 200 which provides a time linear illustration of a performance content such as, for example, a song, instrumental, or the like, to be performed by a user as a complement to the performance content. In the present example, the progress bar is directed to instructions for playing a musical piece on a guitar, including both strumming chords and picking individual notes.

Figure 2B:
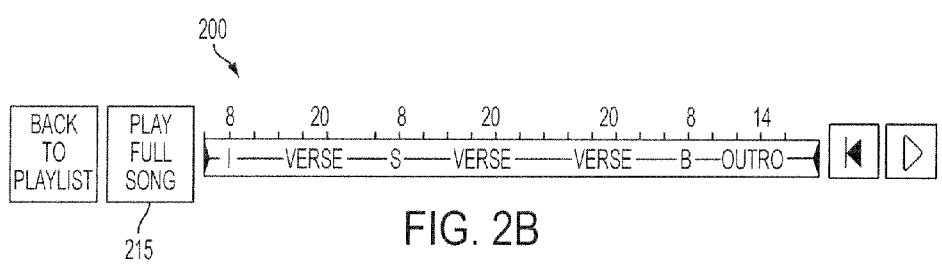
Figure 2C:
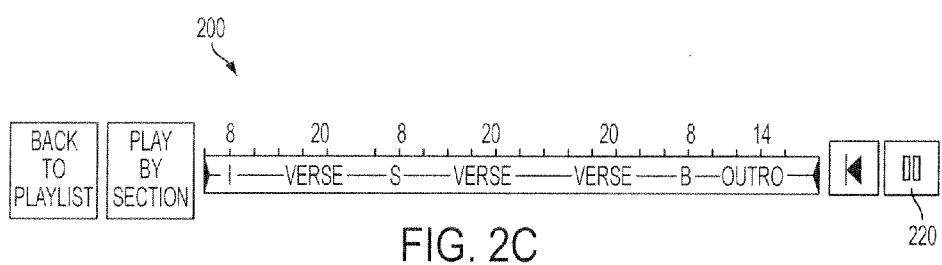

In one embodiment, a particular musical piece may be selected from a library of available pieces by activating a playlist softkey 205 associated with the macro-progress bar 200 on the display. The macro-progress bar 200, in one embodiment, divides the musical piece into a plurality of sections 210 laid out time sequentially, such as introduction, verse, transition, bridge, conclusion, and the like. This provides the student user with a visual representation of the structure of the musical piece. The user may elect to play the instruction player one section 210 at a time, or to play the entire song on the instruction player. This may be done by toggling a play selector softkey 215 that switches the player between playing one section 210 ("Play By Section") and playing the entire song ("Play Full Song," referring to FIG. 2B). In summary, the mode showing in display 200 is the alternate of the option shown on softkey 215. Specifically, for the purpose of illustration, FIG. 2A shows only the "Play By Section" mode of the player softkey 215, which indicates that the player is currently in the "Play Full Song" mode. FIG. 2B shows instructional player with the softkey 215 showing the "Play Full Song" option, indicating that the player is in "Play By Section" mode. In the "Play By Section" mode, the user may click on a desired section 210. The user may then play the selected section 210 by selecting a Run/Pause softkey 220. The selected section 210 will repeat continuously until another softkey 215, or another section 210 is selected. If softkey 215 is in "Play Full Song" mode (i.e., showing "Play By Section" as a selection option), as indicated in FIG. 2A, activating softkey 225 plays a song from the beginning. If softkey 215 is in "Play By Section" mode, as indicated in FIG. 2B, activating softkey 225 plays the song from the beginning of the currently selected section 210. For the purpose of illustration, FIG. 2A the Run/Pause softkey 220 displays "Run," indicating that the player is in "Pause" mode, and that the Run mode may be selected. FIG. 2C shows the Run/Pause softkey 220 displaying the "Pause" symbol, indicating that the player is in "Run" mode, and that the Pause mode may be selected.

In an embodiment, a progress bar marker 230 advances along the macro-progress bar 200 in timed sequence corresponding to the progress of the song. Upon selecting the softkey 225, the player returns the progress bar marker 230 to the beginning of the song or the beginning of the section, depending on the mode of softkey 215.

An audio output 130 presents an audio signal in time correspondence with the progress bar marker 230 on the macro-progress bar 200. The audio signal may include verbal instructions in addition to performance content to be performed by the user, where the musical notes may, for example, be chords or individual picked notes or combinations of picked notes and chords. Alternatively, the audio signal may include only components of the musical piece that complement the part to be played by the user, for example, voice or other instrumentation to be accompanied by the user on guitar. In this manner, the user can hear what the desired guitar sound is intended to be, or the user can provide the guitar accompaniment over the provided audio signal.

In an embodiment, smaller divisions of a section 210, for example, may indicate one or more (musical) measures 240 within the corresponding section.

Figure 3:
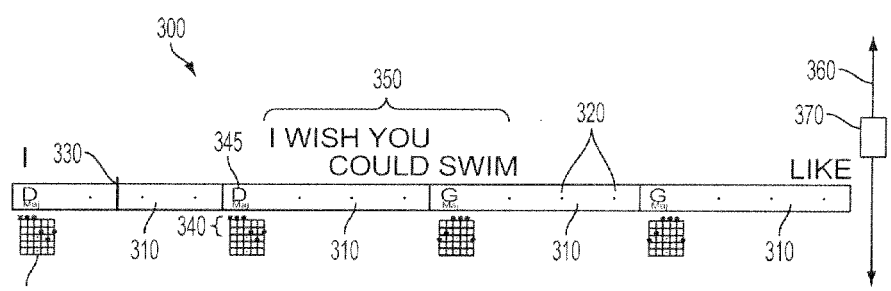
FIG. 3 shows an additional micro-progress bar with fret diagrams.

The progress bar 200 may be further divided, as shown in FIG. 3, into a vertically stacked sequence of micro-progress bars 300. In an embodiment, one or more measures 310 of a section 210 may be displayed in the micro-progress bar 300. Each measure 310 may be divided up, for example, to show beats 320.

Numbers, such as the numbers 242, can be added over each song section 210 on the macro progress bar 200 to indicate the number of measures 240 in each song section 210. In an embodiment, the measures 240 on the macro progress bar 200 may be highlighted to indicate the range covered within each of the micro progress bars 300 displayed in FIG. 3.

When the player is in operation, as the progress bar marker 230 advances, the micro-progress bar 300 displays a sequential plurality of measures 310 that are advanced and replaced as the musical piece progresses.

A micro-progress bar marker 330 advances along the micro-progress bar 300 in time correspondence with the audio signal and the progress bar marker 230 to indicate the instantaneous location within the measure 310 of the musical piece.

In an embodiment, the micro-progress bar 300 may provide a visual representation of a portion of the guitar neck as a fret diagram 335 with frets indicated, and finger positions (chord) 340 on the various strings (illustrated with black dots on the fret diagram 335). When the guitar strings are strummed, the chord 340 produces a desired sound. The fret diagram 335 may be placed at an appropriate location corresponding to a particular beat 320 within a measure 310 to indicate where the chord 340 is played. The chord 340 may be placed at any beat within the measure 310, and repeated, if desired, on every beat 320, until a new chord 340 is introduced. As the micro-progress bar marker 330 advances to a next interval, or beat 320, a visual representation of the fret diagram 335 and chord 340 is provided each time the new chord 340 is to be strummed, at a time location indicated by the micro-progress bar marker 330. The chord designation 345 (e.g., $D_{maj}$, $G_{maj}$, as shown in FIG. 3, may appear, for example in the measure 310 at the same corresponding time location as the fret diagram 335. In an embodiment, the fret diagram 335 may be animated to provide a video representation of fingering positions and changes.

In addition to showing fingerings for the chord 340, the micro-progress bar 300 may provide corresponding fingerings on the fret diagram 335 for plucking individual strings to produce individual notes, for example, to complement a chord during a measure of music.

The micro-progress bar 300 may also be provided with lyrics 350 and other notations, such as, for example, crescendo, staccato, vibrato, and similar notations well known in the art.

In an embodiment, a slide bar 360 including a slide button 370 may be provided to preview all groups of measures 310 contained in the song. For example, as shown in FIG. 3, four measures 310 are shown, but the number of measures 310 displayed may be greater or fewer. Moving the slide button 370 up causes previous groups of measures 310 to be shown, and moving the slide button 370 down causes following groups of measures 310 to be shown. In another embodiment, a plurality of rows of measures 310 can be displayed and moved up and down by moving the slide button 370 using, for example, the keyboard and/or mouse 125 or equivalent interactive control device to change the displayed groups of measures.

An additional plurality of slide bars and slide buttons similar to slide bar 360 and slide button 370 may be provided on the display 120 to independently control, for example, the volume of either the musical accompaniment, the performance content, or a combination of both. The functionality of the slide bars and slide buttons may be realized with equivalent softkey structures provided on the display. For example, rotary softknobs, and the like may be used. The slide bars and slide buttons can be provided for a number of additional functions such as cadence, rhythm, timing, volume or any other variable that is a component of mastery of the art form being taught.

In like manner, other embodiments are disclosed, which may pertain to instruction in other aspects of performance arts. For example, the progress bar may provide lyrics and music for a song, while the audio output provides corresponding musical accompaniment, with or without the voice track, and with or without any corresponding musical accompaniment to provide voice instruction directed at a particular musical piece. In other embodiments for other instruments, choreographic and the like, the fret diagram 335 in FIG. 3 can be replaced by other teaching illustrations adapted to other instruments or art forms. More specifically, the fret diagrams can be replaced with choreographic diagrams showing, for example, foot or body positioning or movement or thumbnail animations of such movements. Also more than one thumbnail type diagram could be stacked vertically in place at the fret diagram shown in the Figures. For example violin bowing and fingering positions could both be shown in stacked arrangement. Fingering diagrams for wind instruments and appropriate illustrations for percussion instruments could also be incorporated. Of course, the fret diagrams will change for the number of strings of the instrument and the computer program would be adapted to display the diagrams for the specific instrument or art form being taught. This could either be an option where the user selects the instrument or art form being taught or separate programs for each instrument could be made available.

It is to be understood that the present disclosure is not limited to the embodiment described above, but encompasses any and all embodiments within the scope of the following claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the embodiments of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for learning a musical performance comprising:
    an instructional program stored in a memory, the program executable by a computer;
    a display for visual output, the display coupled to the computer and controlled by the program;
    an interactive device coupled to the computer comprising at least one of a keyboard and a mouse to interactively control the program, the interactive device being capable of transmitting and/or receiving data from the computer;
    an audio output coupled to the computer, the audio output controlled by the program to function cooperatively with the display output;
    a macro-progress bar provided on the display,
        wherein the macro-progress bar provides a time progress marker advancing with time as a corresponding indicator of a location within a performance content and provides instructions for performing the performance content,
        wherein the audio output provides a sound signal corresponding to the macro-progress bar marker, and
        wherein the macro-progress bar is divided into segments to organize an index of the performance content; and,
    a plurality of micro-progress bars corresponding to each said segment of said macro-progress bar,
        wherein each said micro-progress bar displays a time linear instruction in synchronization with said macro-progress bar for instructing a user how and when to execute a user component of a performance content, such as musical notes, chords, finger positioning, measures, speech, cadence, dance steps, rhythmic elements, timing and volume of the user component of the performance content.

2. The system of claim 1, wherein the performance content is directed to at least one of a musical instrument, singing, acting, choreography, speech and dialog.

3. The system of claim 2, wherein the musical instrument is at least one of a string instrument, wind instrument, reed instrument, percussion instrument and electronic synthesizer.

4. The system of claim 2, the display further comprising a slider bar and a slider button adapted to change the segments displayed in the micro-progress bar.

5. The system of claim 1, wherein the audio output is provided with or without the user component of the performance content.

6. The system of claim 1, wherein the performance content is selected from a library stored on a server memory.

7. The system of claim 1 wherein the micro-progress bar includes a diagram of a musical instrument's frets and an indication on the diagram of a player's finger positions for a particular beat, the diagram placed at a location corresponding to the particular beat within the performance content.

8. The system of claim 7 wherein the diagram comprises a video representation of fingering positions and changes.

9. The system of claim 7 wherein the musical instrument is a guitar.

* * * * *